United States Patent
Gottsov et al.

(10) Patent No.: US 11,847,010 B2
(45) Date of Patent: *Dec. 19, 2023

(54) APPLIANCE AND METHODS FOR OPERATING SAME IN A SAFETY-CRITICAL OPERATION

(71) Applicant: Haier US Appliance Solutions, Inc., Wilmington, DE (US)

(72) Inventors: Alex Gottsov, Louisville, KY (US); Steven Michael Recio, Louisville, KY (US); Craig Edward Wicke, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 545 days.

This patent is subject to a terminal disclaimer.

(21) Appl. No.: 16/024,951

(22) Filed: Jul. 2, 2018

(65) Prior Publication Data

US 2020/0005690 A1    Jan. 2, 2020

(51) Int. Cl.
*G06F 3/0488* (2022.01)
*F24C 14/00* (2006.01)
*G09G 3/34* (2006.01)
*F24C 7/08* (2006.01)
*G06F 1/3287* (2019.01)
*G09G 3/00* (2006.01)

(52) U.S. Cl.
CPC .............. *G06F 1/3287* (2013.01); *F24C 7/08* (2013.01); *F24C 7/085* (2013.01); *F24C 14/00* (2013.01); *G06F 3/0488* (2013.01); *G09G 3/006* (2013.01); *G09G 2310/0237* (2013.01)

(58) Field of Classification Search
None
See application file for complete search history.

(56) References Cited

U.S. PATENT DOCUMENTS

| | | | | |
|---|---|---|---|---|
| 4,431,907 A | * | 2/1984 | Barnett | F24C 7/08 219/413 |
| 4,908,760 A | * | 3/1990 | Sinn | F24C 14/02 219/413 |
| 5,534,678 A | | 7/1996 | Bowles et al. | |
| 5,572,438 A | * | 11/1996 | Ehlers | H02J 13/00028 700/295 |
| 6,750,433 B2 | | 6/2004 | Guenther et al. | |

(Continued)

FOREIGN PATENT DOCUMENTS

| | | |
|---|---|---|
| CN | 102591215 | 7/2012 |
| CN | 202502373 | 10/2012 |

(Continued)

OTHER PUBLICATIONS

Fujitsu, Guidelines for Meeting IEC 60730 Class B Requirements with FM3 MCUs, 2011.*

(Continued)

*Primary Examiner* — John J Norton
*Assistant Examiner* — Simpson A Chen
(74) *Attorney, Agent, or Firm* — Dority & Manning, P.A.

(57) ABSTRACT

An appliance and methods for operating the appliance in a safety-critical operation are provided. The appliance and methods for operating the appliance include features that provide safe and intuitive ways to initiate and cancel safety-critical operations performed by the appliance.

13 Claims, 7 Drawing Sheets

(56) References Cited

U.S. PATENT DOCUMENTS

| | | | | |
|---|---|---|---|---|
| 7,394,451 B1* | 7/2008 | Patten | ............... | G06F 1/3203 |
| | | | | 361/679.41 |
| 7,908,019 B2* | 3/2011 | Ebrom | ............... | G06Q 10/06 |
| | | | | 700/11 |
| 8,031,164 B2* | 10/2011 | Herz | ............... | G06F 1/3265 |
| | | | | 345/102 |
| 8,706,933 B2* | 4/2014 | Pimputkar | ........ | H04L 12/40045 |
| | | | | 710/62 |
| 8,959,445 B2* | 2/2015 | Sirpal | ............... | G06F 1/1647 |
| | | | | 715/767 |
| 9,401,822 B2* | 7/2016 | McCoy | ............... | H04L 12/66 |
| 9,829,201 B2* | 11/2017 | Boedicker | ............ | F24C 7/085 |
| 10,333,731 B2* | 6/2019 | Ebrom | ............ | H04L 12/1886 |
| 10,650,184 B2* | 5/2020 | Frazer | ............... | G06F 40/166 |
| 2002/0097141 A1 | 7/2002 | Denison et al. | | |
| 2004/0069764 A1* | 4/2004 | Imai | ............... | F24C 14/00 |
| | | | | 219/390 |
| 2007/0288251 A1* | 12/2007 | Ebrom | ............... | D06F 33/00 |
| | | | | 705/1.1 |
| 2011/0266271 A1* | 11/2011 | Boyer | ............... | F24C 15/00 |
| | | | | 219/393 |
| 2014/0352549 A1* | 12/2014 | Upston | ............ | A47J 37/0857 |
| | | | | 99/334 |
| 2015/0282251 A1* | 10/2015 | Meusburger | ............ | F24C 3/124 |
| | | | | 219/494 |
| 2016/0076777 A1* | 3/2016 | Wait | ............... | F24C 14/00 |
| | | | | 126/197 |
| 2017/0280515 A1* | 9/2017 | Imai | ............... | H05B 6/6455 |
| 2020/0003425 A1* | 1/2020 | Gottsov | ............ | F24C 14/00 |

FOREIGN PATENT DOCUMENTS

| | | |
|---|---|---|
| CN | 105455658 | 4/2016 |
| CN | 106901615 | 6/2017 |
| CN | 207236649 | 4/2018 |
| DE | 102313017202 A1 | 4/2015 |

OTHER PUBLICATIONS

Samsung User manual, Electric Range FE710DRS_XAA_DG68-00333A-07, Oct. 31, 2012.*

International Search Report, PCT Application No. PCT/CN2019/094358, dated Sep. 26, 2019, 2 pages.

Chris Shaw, ARM9 micro enables support for home appliance safety standards, New Electronics, New Electronics, http://www.newelectronics.co.uk/electronics-news/arm9-micro-enables-support-for-home-appliance-safety-standards/21916/ Jan. 14, 2010, 2 pages.

LG, Cleaning, care and maintenance, http://www.lg.com/us/support/answers/ranges2015/electric/cleaning-maintenance 2015, 4 pages.

* cited by examiner

APPLIANCE AND METHODS FOR OPERATING SAME IN A SAFETY-CRITICAL OPERATION

FIELD OF THE INVENTION

The subject matter of the present disclosure relates generally to methods and systems for operating an appliance in a safety critical operation, such as an oven appliance in a self-cleaning cycle.

BACKGROUND OF THE INVENTION

Consumer appliances configured to perform safety-critical operations are required to meet certain industry safety standards. For instance, oven appliances configured to perform self-cleaning cycles are required to have a minimum of two distinct steps to initiate the cycle. Further, to stop a self-cleaning cycle, such oven appliances are required to have a single step means to cancel the cycle. Such requirements are mandated by various standards, including UL858, set by Underwriters Laboratories (UL). Moreover, generally, at least one computing device managing such operations must be UL 60730 Class B compliant. That is, the computing device must have the ability to investigate single order failure faults, e.g., for control functions and software executable on the computing device.

Conventional appliances have relied on multiple static keys to meet the two-step industry standards. This may make the design less appealing, more costly and space consuming, and the computing device must manage all of the different static keys. Some appliances integrate static keys with touchscreens. Such touchscreens are typically managed by a microprocessor running a high-level operating system. Such microprocessors are generally not UL 60730 Class B compliant. Thus, it has been a challenge for appliances having touchscreens to meet industry standards.

Accordingly, an oven appliance and methods therefore that address one or more of the challenges noted above would be useful.

BRIEF DESCRIPTION OF THE INVENTION

Aspects and advantages of the invention will be set forth in part in the following description, may be apparent from the description, or may be learned through practice of the invention.

In one exemplary embodiment, an appliance is provided. The appliance includes one or more operational components configured to perform a safety-critical operation. The appliance also includes a control system for operating the appliance in the safety-critical operation. The control system includes a main controller. The control system also includes a user interface panel comprising a first user control and a second user control. Further, the control system includes a microprocessor communicatively coupled with the main controller and the first user control. The microprocessor is configured to: receive a first initiation signal from the first user control to initiate the safety-critical operation. The control system also includes a microcontroller communicatively coupled with the main controller and the second user control. The microcontroller is configured to: receive a second initiation signal from the second user control to initiate the safety-critical operation. In such embodiments, the main controller is configured to: receive, in response to the first initiation signal received at the microprocessor, a first activation signal from the microprocessor; receive, in response to the second initiation signal received at the microcontroller, a second activation signal from the microcontroller; and activate, upon receiving the first activation signal and the second activation signal, the one or more operational components to operate the appliance in the safety-critical operation.

In another exemplary embodiment, a method for operating an appliance in a safety-critical operation is provided. The method includes receiving a first initiation signal at a microprocessor in response to a first user input of a first user control of a user interface panel of the appliance. The method also includes receiving, in response to the first initiation signal, a first activation signal at a main controller. Further, the method includes activating, in response to receiving the first activation signal at the main controller, a second user control of the user interface panel. Moreover, the method includes receiving a second initiation signal at a microcontroller in response to a second user input of the second user control. In addition, the method includes receiving, in response to the second initiation signal, a second activation signal at the main controller. Further, the method includes activating, upon receiving the first activation signal and the second activation signal, one or more operational components to operate the appliance in the safety-critical operation.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
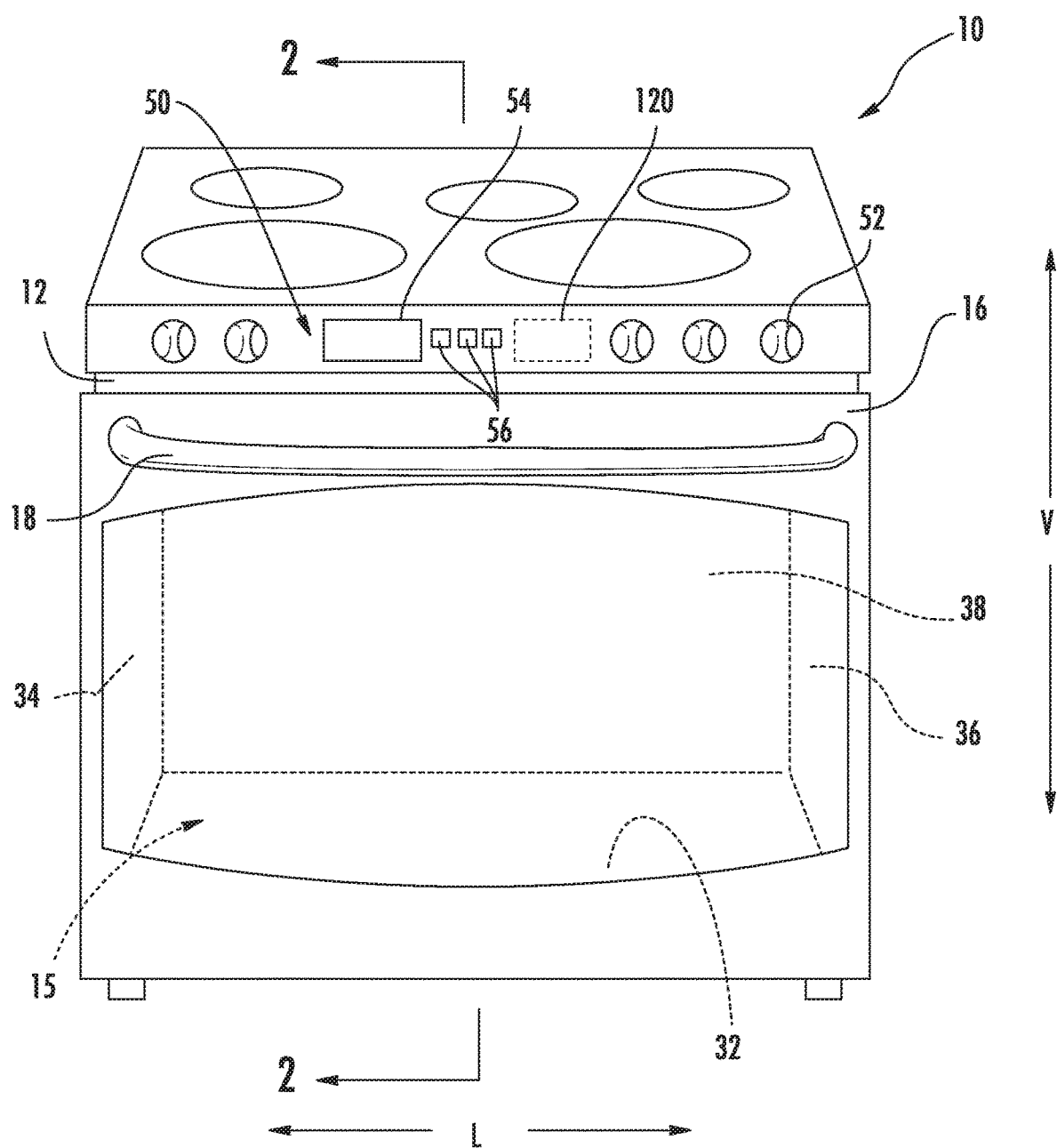
FIG. 1 provides a front perspective view of an oven appliance according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
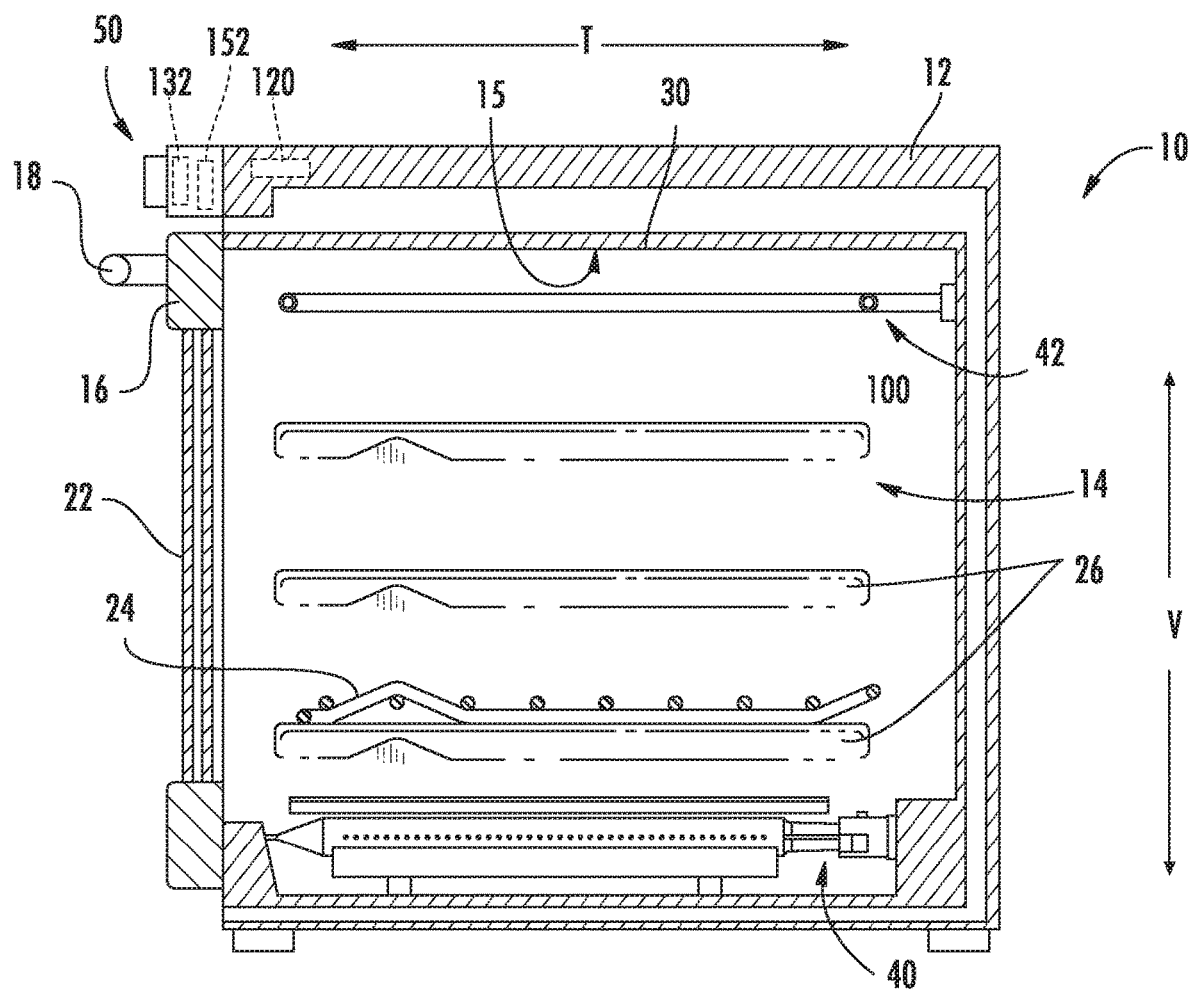
FIG. 2 provides a cross-sectional view of the example oven appliance of FIG. 1 taken along line 2-2 of FIG. 1.

FIGS. 1 and 2 provide various views of an exemplary oven appliance 10 according to exemplary embodiments of the present disclosure. In particular, FIG. 1 provides a front perspective view of oven appliance 10 and FIG. 2 provides a cross-sectional view of oven appliance 10 taken along line 2-2 of FIG. 1. As depicted, oven appliance 10 defines a vertical direction V, a lateral direction L, and a transverse direction T. The vertical direction V, lateral direction L, and transverse direction T are mutually perpendicular and form an orthogonal direction system. As will be understood, oven appliance 10 is provided by way of example only and that the present subject matter may be incorporated into any suitable appliance. Thus, the present subject matter may be used with other oven or range appliance configurations, e.g., that define multiple interior cavities for the receipt of food and/or having different configuration than what is shown in FIGS. 1 and 2. The present subject matter may be incorporated into other suitable types of appliances as well that are configured to perform safety-critical operations, such as e.g., cooktop appliances, dryers, washing machines, microwaves, etc.

Oven appliance 10 includes an insulated cabinet 12 that defines an oven cavity, such as a cooking chamber 14 (FIG. 2). More particularly, cooking chamber 14 is defined by various interior surfaces 15 of cabinet 12. Cooking chamber 14 is configured for the receipt of one or more food items to be cooked. Oven appliance 10 includes a door 16 rotatably mounted to cabinet 12, e.g., with a hinge (not shown). A handle 18 is mounted to door 16 and assists a user with opening and closing door 16 in order to access opening 20 to cooking chamber 14. For example, a user can pull on handle 18 to open or close door 16 and access cooking chamber 14 through opening 20.

Oven appliance 10 can include one or more seals (not shown) between door 16 and cabinet 12 that assist with maintaining heat and cooking fumes within cooking chamber 14 when door 16 is closed as shown in FIG. 2. Multiple parallel glass panes 22 (FIG. 2) provide for viewing the contents of cooking chamber 14 when door 16 is closed and assist with insulating cooking chamber 14. A baking rack 24 is positioned in cooking chamber 14 for the receipt of one or more food items and/or utensils containing food items. Baking rack 24 is slidably received onto embossed ribs 26 or sliding rails such that rack 24 may be conveniently moved into and out of cooking chamber 14 when door 16 is open.

As shown, various sidewalls of cabinet 12 define cooking chamber 14. For this embodiment, cooking chamber 14 includes a top wall 30 (FIG. 2) and a bottom wall 32 (FIG. 1) which are spaced apart along the vertical direction V. Left sidewall 34 and right sidewall 36 (as defined according to a front view as shown in FIG. 1) extend between and connect top wall 30 and bottom wall 32 and are spaced apart along the lateral direction L. A rear wall 38 (FIG. 1) extends between the top wall 30 and bottom wall 32 as well as between the left sidewall 34 and right sidewall 36 and is spaced apart from door 16 along the transverse direction T. Cooking chamber 14 is thus defined between top wall 30, bottom wall 32, left sidewall 34, right sidewall 36, and rear wall 38.

As shown particularly in FIG. 2, for this embodiment, a gas fueled or electric bottom heating element 40 (e.g., a gas burner or an electric heating element) is positioned in cabinet 12, e.g., at a bottom portion of cabinet 12. Bottom heating element 40 may be used to heat cooking chamber 14 for both cooking and cleaning of oven appliance 10. For instance, heating element 40 may be used to heat cooking chamber 14 for a self-cleaning cycle. The size and heat output of bottom heating element 40 can be selected based on the e.g., the size of oven appliance 10.

A top heating element 42 is positioned in cooking chamber 14 of cabinet 12, e.g., at a top portion of cabinet 12. Top heating element 42 may be used to heat cooking chamber 14 for both cooking/broiling and cleaning cycles of oven appliance 10. Like bottom heating element 40, the size and heat output of top heating element 42 can be selected based on the e.g., the size of oven appliance 10. In the example embodiment shown in FIG. 2, top heating element 42 is shown as an electric resistance heating element. However, in alternative embodiments, a gas, microwave, halogen, or any other suitable heating element may be used instead of electric resistance heating element 42.

As shown best in FIG. 1, oven appliance 10 includes a user interface panel 50. User interface panel 50 may include various input controls, such as one or more of a variety of electrical, mechanical or electro-mechanical input devices. The controls may include rotary dials, push buttons, touchpads, and touchscreens, for example. For this embodiment, user interface panel 50 includes a plurality of control knobs 52 (e.g., for operating the burner assemblies of range appliance of oven appliance 10), a touchscreen 54, and one or more discrete keys 56. Touchscreen 54 may be any suitable type of touchscreen. For instance, touchscreen 54 may be a resistive, capacitive, surface acoustic wave, infrared, optical imaging, or an acoustic pulse recognition touchscreen. The one or more discrete keys 56 may be touch sensitive controls, such as electronic pushbuttons. In some embodiments, touchscreen 54 is a liquid crystal display (LCD) touchscreen and at least one of the discrete keys 56 is an electronic pushbutton that is illuminated by a separate backlight than touchscreen 54. The discrete keys 56 may have redundant channels powering the backlight. A main controller 120, which will be described in further detail herein, is communicatively coupled with the various controls of user interface panel 50 through which a user may select various operational features and modes and monitor progress of oven appliance 10. Additionally, one or more controls of oven appliance 10 may communicate with main controller 120 to start a safety-critical operation, such as e.g., a self-clean cycle.

Figure 3:
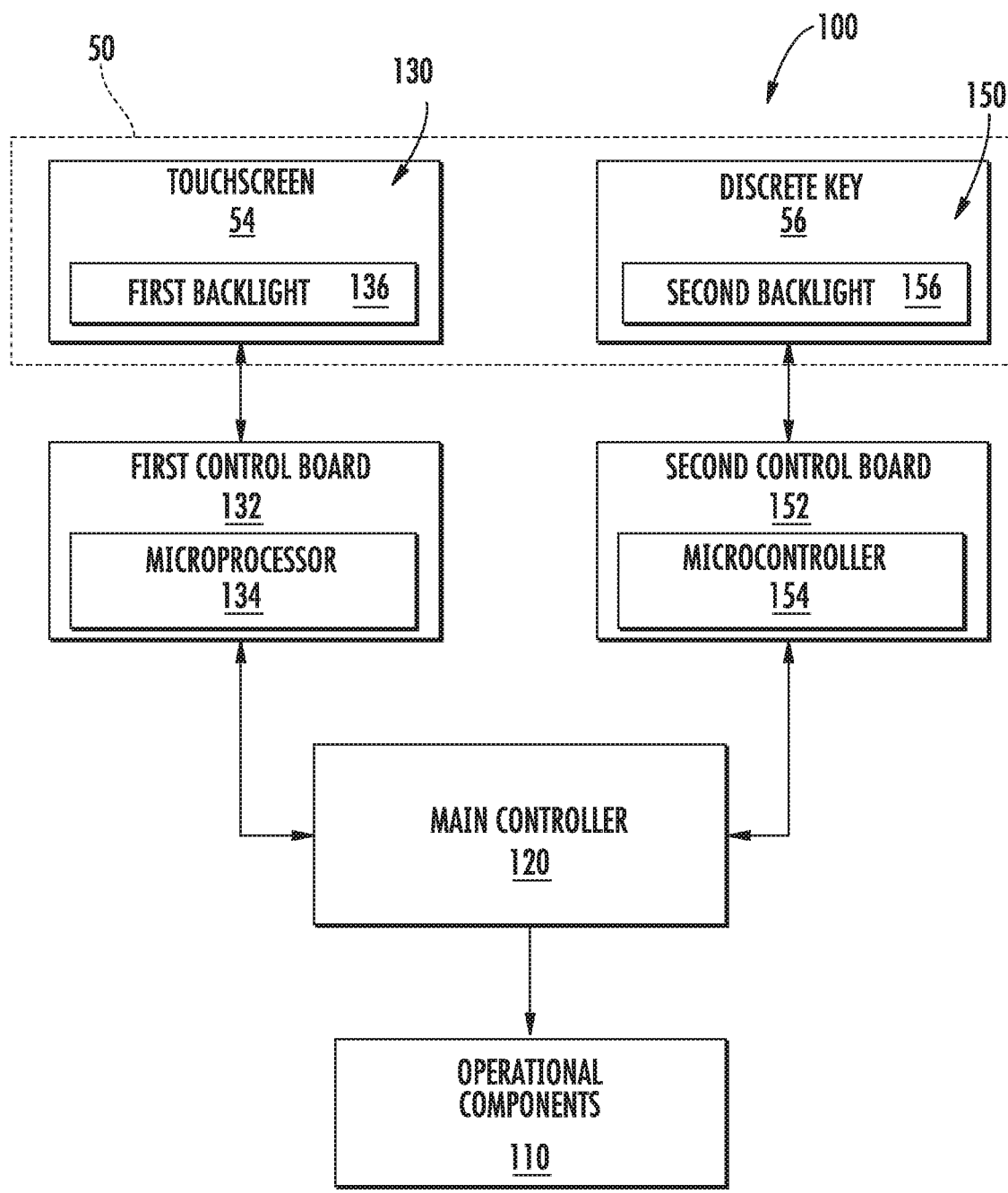
FIG. 3 provides a block diagram of an exemplary control system of the oven appliance of FIGS. 1 and 2.

FIG. 3 provides a block diagram of an exemplary control system 100 for operating oven appliance 10 of FIGS. 1 and 2 in a safety-critical operation. However, it will be appreciated that the control system 100 depicted in FIG. 3 and described below may be incorporated into other suitable appliances, e.g., cooktop appliances.

As shown in FIG. 3, control system 100 includes main controller 120. Generally, main controller 120 is configured for operating oven appliance 10. For instance, main controller 120 may be configured to control one or more operational components 110 of oven appliance 10. Example operational components may include one or more of heating elements 40, 42 (FIG. 2). Main controller 120 may control at least one operation of heating elements 40 and 42, e.g., to perform a self-cleaning cycle. Main controller 120 is communicatively coupled with the one or more operational components 110. For instance, main controller 120 may be in communication via a suitable wired or wireless connection with heating element 40, heating element 42, the controls of user interface panel 50, temperature sensing devices, and/or other suitable components of oven appliance 10.

In some example embodiments, main controller 120 may include one or more memory devices and one or more processing devices, such as general or special purpose microprocessors operable to execute programming instructions or micro-control code associated with operating oven appliance 10. The memory device (i.e., memory) may represent random access memory, such as e.g., DRAM, or read only memory such as EEPROM or FLASH. In some embodiments, the one or more processing devices execute programming instructions stored in memory. The memory may be a separate component from the processor or may be included onboard within the processor. The memory can store information accessible to processing device, including instructions that can be executed by processing device. Optionally, the instructions can be software or any set of instructions that, when executed by the processing device, cause the one or more processing devices to perform operations. For certain embodiments, the instructions include a software package configured to operate oven appliance 10 and interpret one or more electrical signals. For example, the instructions may include a software package configured to execute commands based on feedback from user controls as described more fully below.

Main controller 120 may be positioned in a variety of locations throughout oven appliance 10. As illustrated in FIG. 2, main controller 120 may be located proximate user interface panel 50 of oven appliance 10. In such embodiments, input/output ("I/O") signals may be routed between main controller 120 and various operational components 110 of oven appliance 10, such as heating element 40, heating element 42, various controls of user interface panel 50, sensors, alarms, and/or other components as may be provided. For instance, signals may be directed along one or more wiring harnesses that may be routed through cabinet 12.

User interface panel 50 includes a first user control 130 and a second user control 150. First user control 130 and second user control 150 are each communicatively coupled with main controller 120. Generally, based on user inputs of first user control 130 and second user control 150, main controller 120 may perform operations of oven appliance 10, such as e.g., cooking operations or one or more safety-critical operations. First user control 130 and second user control 150 may be any suitable type of controls. For this embodiment, first user control 130 is touchscreen 54 and second user control 150 is one of the discrete keys 56 of user interface panel 50. Further, for this embodiment, touchscreen 54 is illuminated by a first backlight 136 and discrete key 56 is illuminated by a second backlight 156. Second backlight 156 is powered by redundant (i.e., multiple) channels and are distinct from the channels operating first backlight 136. In some embodiments, second backlight 156 is powered independently from first backlight 136.

As further depicted in FIG. 3, control system 100 includes a microprocessor 134 connected to a first control board 132. First control board 132 houses microprocessor 134 along with other electronic components. Generally, microprocessor 134 is configured to run a high-level operating system for processing inputs from various controls of user interface panel 50, and in some instances, driving the controls to provide user feedback. In particular, microprocessor 134 receives inputs from touchscreen 54 and changes the images on the display of touchscreen 54. More particularly still, microprocessor 134 receives inputs from a touchscreen controller (not shown) of touchscreen 54 and microprocessor 134 drives change of the images on the display of touchscreen 54 in accordance with the inputs received from the touchscreen controller. First control board 132 is communicatively coupled with touchscreen 54 and main controller 120, e.g., via any suitable wired or wireless connection). In this way, first control board 132 may provide user feedback from first user control 130 to main controller 120. For this embodiment, microprocessor 134 is UL 60730 Class A compliant, but not Class B compliant. That is, microprocessor 134 is not relied upon for the safety of oven appliance 10.

Control system 100 also includes a microcontroller 154 connected to a second control board 152. Second control board 152 houses microcontroller 154 along with other electronic components. Second control board 152 is communicatively coupled with discrete key 56 and main controller 120, e.g., via any suitable wired or wireless connection. In this way, second control board 152 may provide user feedback from second user control 150 to main controller 120.

Microcontroller 154 may include one or more processor(s) and associated memory device(s) configured to perform a variety of computer-implemented functions and/or instructions (e.g., performing the methods, steps, calculations and the like and storing relevant data as disclosed herein). The instructions when executed by the processor(s) can cause the processor(s) to perform operations according to the present disclosure. Further, the microcontroller 154 may include one or more input/output port(s) to interface the microcontroller 154 with main controller 120.

For this embodiment, microcontroller 154 is UL 60730 Class B compliant. That is, microcontroller 154 is relied upon for safety of operating oven appliance 10. As microcontroller 154 is Class B compliant, microcontroller 154 may sense a malfunction and influence main controller 120 to switch oven appliance 10 "off". For instance, microcontroller 154 may include instructions that, when executed, cause the processor(s) to perform self-test operations of the hardware and critical functions of microcontroller 154. Such self-test operations may be performed at predetermined intervals. Microcontroller 154 may be communicatively coupled with a watchdog timer external to microcontroller 154 to trigger or initiate the self-test operations at the predetermined interval. Additionally or alternatively, microcontroller 154 may include at least two oscillators. One oscillator may be used to operate discrete key 56 and to route user feedback to main controller 120. The other oscillator may be used to supply an independent timer for the periodic self-test operations.

Generally, the various features of control system 100 of oven appliance 10 enable safety-critical operations to be initiated and canceled with dynamic controls whilst complying with industry standards, such as UL858, and having control features that are UL 60730 Class B compliant. The features of control system 100 enable a user to initiate a safety-critical operation with a two-step or touch process. More particularly, a user may commence a safety-critical operation of oven appliance 10 in the exemplary manner described below with reference generally to FIG. 3. Specific reference may be made to FIGS. 4, 5, and 6.

Figure 4:
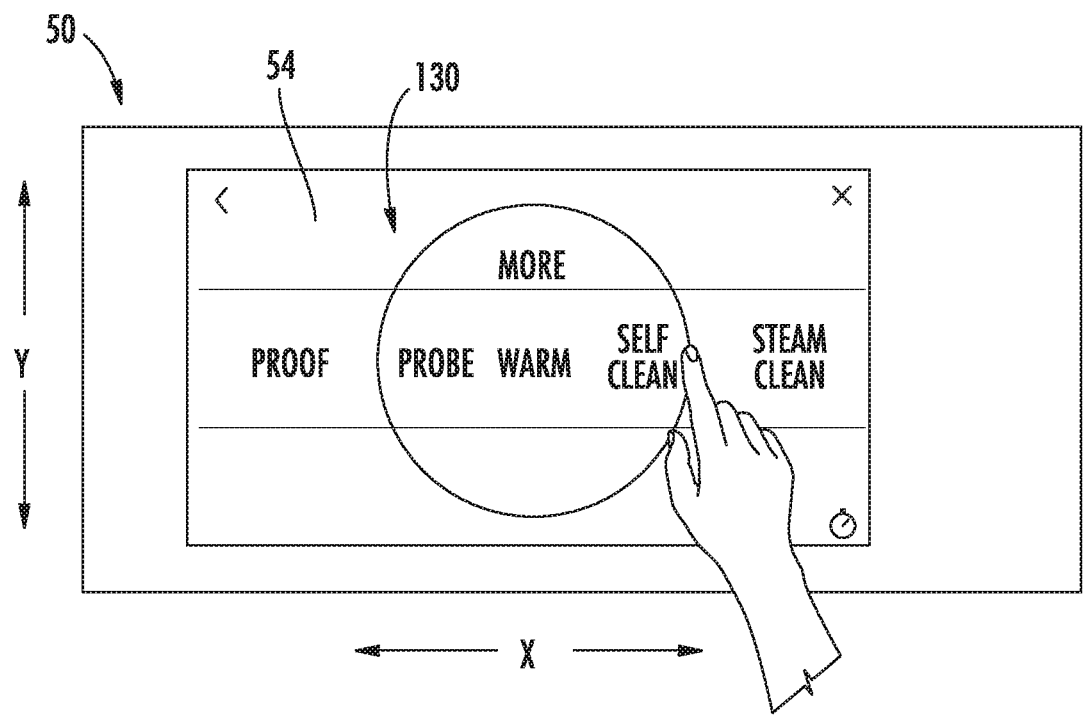
FIG. 4 provides a close up, schematic view of an exemplary user interface panel of the oven appliance of FIG. 1.

FIG. 4 provides a close up, schematic view of user interface panel 50 of the oven appliance 10 of FIG. 1. A user begins initiation of the safety-critical operation by a user input or touch of touchscreen 54 (first user control 130). As shown in FIG. 4, the user selects the "Self Clean" option on touchscreen 54. Microprocessor 134 monitors for the user input (touch input) in the appropriate location on touchscreen 54. The location may be a touch region defined at particular coordinates on touchscreen 54. For instance, for this example, the touch region is a region extending generally around the perimeter of where the "Self Clean" option is illuminated on touchscreen 54. The touch region may be defined by any suitable means, such as e.g., X-Y coordinates as shown in FIG. 4. If the user touches the appropriate location on touchscreen 54, microprocessor 134 connected to first control board 132 receives a first initiation signal from first user control 130 (touchscreen 54 in this embodiment) to initiate the safety-critical operation. More particularly, the first initiation signal is received by microprocessor 134 from the touchscreen controller (not shown) of touchscreen 54. The touchscreen controller determines the location of the user input or touch on touchscreen 54, e.g., as an X-Y coordinate. Microprocessor 134 processes the first initiation signal, and in response to the first initiation signal, sends a first activation signal to main controller 120. Main controller 120 receives the first activation signal from microprocessor 134.

Upon or after receiving the first activation signal from microprocessor 134, in some embodiments, main controller 120 sends or routes a trigger signal to microcontroller 154. Upon receiving the trigger signal, microcontroller 154 activates second user control 150, which is discrete key 56 in this embodiment. Further, upon receiving the trigger signal, microcontroller 154 activates second backlight 156 to illuminate discrete key 56. Thus, discrete key 56 becomes operational and visible to the user. For this embodiment, second user control 150 becomes active only after the main controller 120 receives the first activation signal. As discrete key 56 may be illuminated on and off, and activated and deactivated, discrete key 56 is a dynamic key. As discrete key 56 is dynamic, discrete key 56 prevents users from inadvertently triggering or touching of discrete key 56 and directs a user's attention to the key when it becomes illuminated. Thus, it becomes intuitive for users to press or touch the discrete key 56 to finish the initiation of the safety-critical operation.

Figure 5:
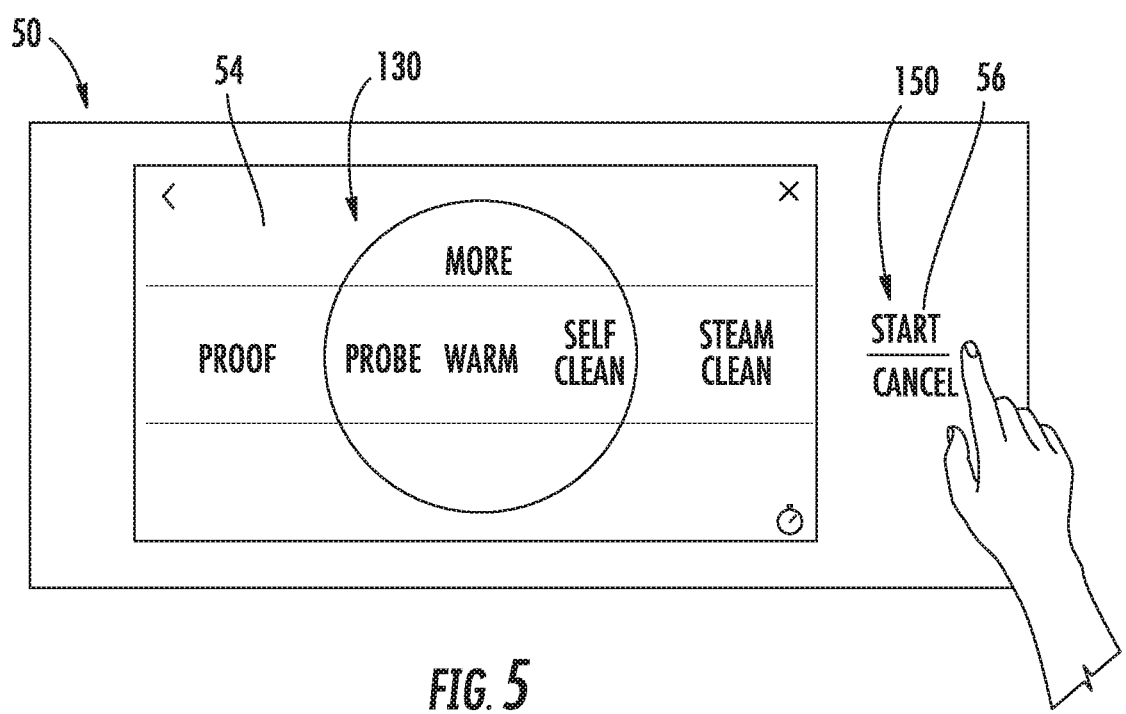
FIG. 5 provides another close up, schematic view of the user interface panel of FIG. 4.

FIG. 5 provides another close up, schematic view of user interface panel 50. As shown, upon microcontroller 154 receiving the trigger signal, microcontroller 154 activates second backlight 156 (FIG. 3) to illuminate discrete key 56 and activates discrete key 56 so that it is operational (i.e., functional). In some alternative embodiments, however, discrete key 56 may be a static key. That is, it may always be illuminated when oven appliance 10 is turned on and/or the key may always be active.

After microcontroller 154 activates discrete key 56 and activates second backlight 156 to illuminate discrete key 56, microcontroller 154 monitors for a user input of discrete key 56. If the user provides a user input to discrete key 56, e.g., as shown in FIG. 5, microcontroller 154 receives a second initiation signal from second user control 150 (discrete key 56 in this embodiment) to initiate the safety-critical operation. Microcontroller 154 processes the second initiation signal, and in response to the second initiation signal, microcontroller 154 sends a second activation signal to main controller 120. Main controller 120 receives the second activation signal from microcontroller 154.

Upon receiving the first activation signal from microprocessor 134 and the second activation signal from microcontroller 154, main controller 120 activates the one or more operational components 110 to operate the appliance in the safety-critical operation, which in this example is a self-cleaning operation.

In some embodiments, upon receiving the first activation signal, a timer associated with main controller 120 commences a countdown, e.g., thirty (30) seconds. The countdown is set such that a user has a predetermined time in which to provide a user input to second user control 150 to confirm initiation of the safety-critical operation. That is, main controller 120 is configured to not activate the one or more operational components 110 to operate oven appliance 10 in the safety-critical operation if the second activation signal is not received by main controller 120 within the predetermined time after receiving the first activation signal. As noted above, the predetermined time may be, for example, thirty (30) seconds.

Figure 6:
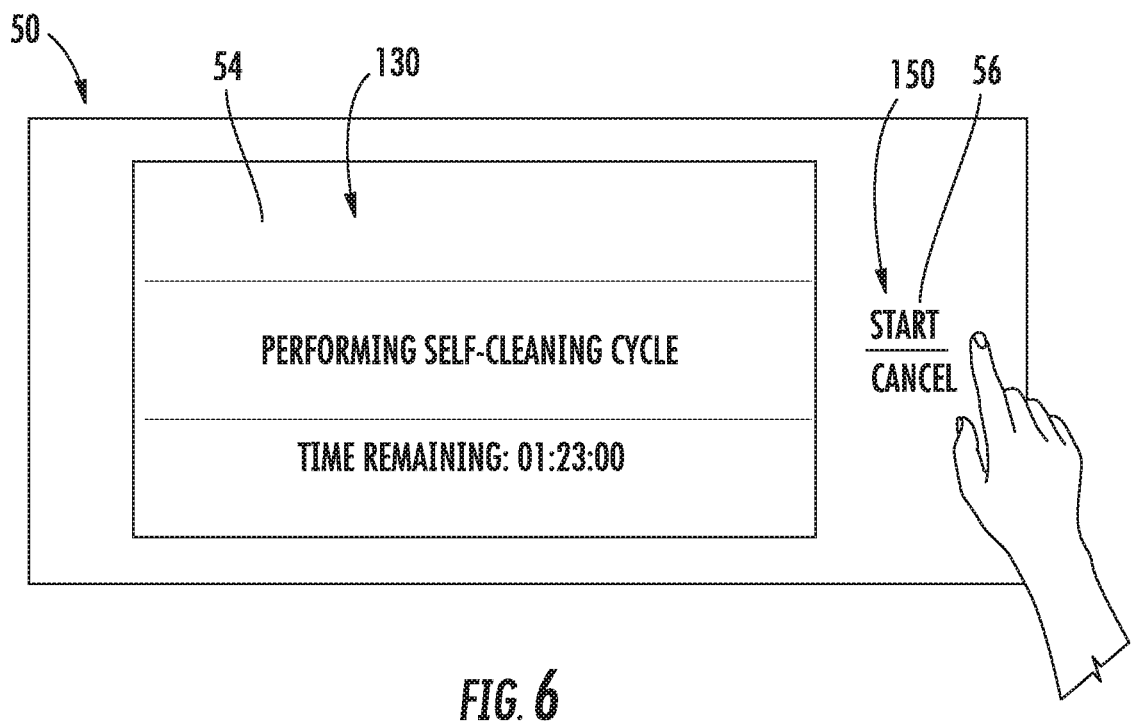
FIG. 6 provides yet another close up, schematic view of the user interface panel of FIG. 4.

FIG. 6 provides another close up, schematic view of user interface panel 50. After initializing the safety-critical operation, oven appliance 10 operates in the safety-critical operation. During operation of oven appliance 10 in the safety-critical operation, discrete key 56 is configured to remain illuminated, e.g., as shown in FIG. 6, and should a user desire to interrupt the safety-critical operation, microcontroller 154 is configured to receive one or more signals from second user control 150 indicative of a user cancel input at second user control 150. That is, if a user presses, touches, or otherwise supplies an input to discrete key 56 during operation of the safety-critical operation as shown in FIG. 6, then microcontroller 154 receives one or more signals, e.g., from the electronics of discrete key 56, indicative of the user cancel input to discrete key 56. Upon receiving the one or more signals indicative of the user cancel input from discrete key 56, microcontroller 154 sends a cancel signal to main controller 120. Upon receiving the cancel signal at main controller 120, main controller 120 deactivates or terminates operation of the one or more operational components 110 performing the safety-critical operation. Accordingly, the safety-critical operation may be interrupted as a one-step process using a UL 60730 Class B compliant microcontroller 154 and meeting industry standards (e.g., UL858).

Further, during safety-critical operations, microcontroller 154 may run one or more self-tests, e.g., at predetermined intervals, to confirm the various hardware components of microcontroller 154, hardware of control system 100, and other critical elements are functioning properly. If any issues or failures are detected during the self-test or if microcontroller 154 detects that a critical component has failed, microcontroller 154 may send a cancel signal to main controller 120 to cancel the safety-critical operation.

Figure 7:
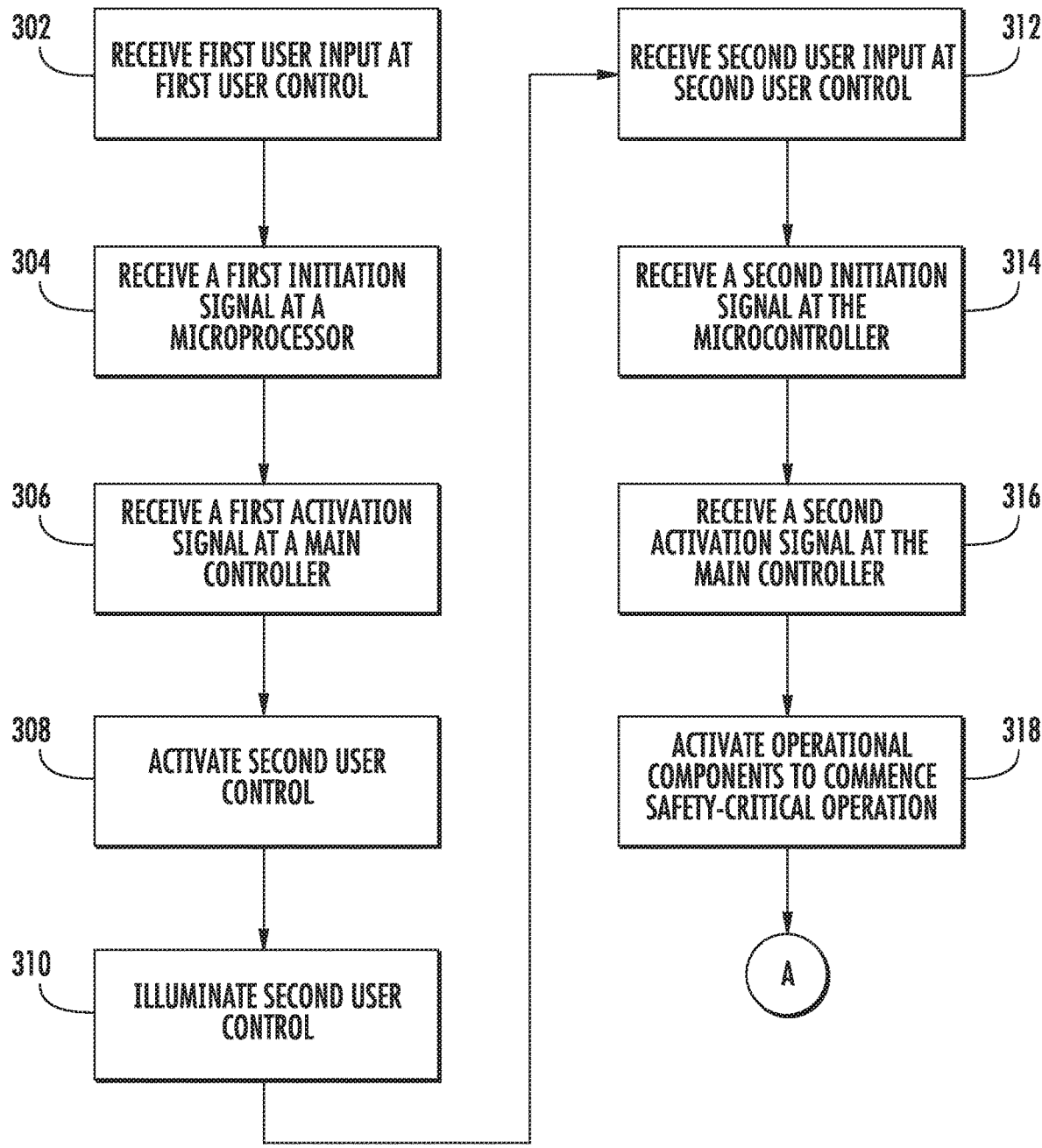
FIG. 7 provides a flow diagram of an exemplary method for operating an appliance in a safety-critical operation.

FIG. 7 provides a flow diagram of an exemplary method (300) for operating an appliance in a safety-critical operation. For instance, method (300) may be utilized to operate an oven appliance in a self-cleaning cycle, such as e.g., the oven appliance 10 of FIGS. 1 and 2. Portions of method (300) may implemented by control system 100 depicted in FIG. 3 and described in the accompanying text or by any other suitable device or component. Accordingly, reference numerals used to describe and illustrate the features of oven appliance 10 of FIGS. 1 and 2 and control system 100 of FIG. 3 will be utilized below to provide context to method (300).

At (302), method (300) includes receiving a first user input at first user control. For instance, first user control may be touchscreen 54 and the first user input may be a touch or press of touchscreen 54. In FIG. 4, a user is shown providing a first user input to touchscreen 54, which is first user control 130 in this example. Notably, the first user input must be provided in the appropriate touch region to begin initiation of the safety-critical operation, which in this example is a self-cleaning cycle of oven appliance 10. The touch region may be defined about the perimeter of the illuminated text "Self Clean," for example.

At (304), method (300) includes receiving a first initiation signal at a microprocessor in response to the first user input of the first user control of a user interface panel of the oven appliance. For instance, a touchscreen controller of touchscreen 54 may sense or detect the location of the first user input on touchscreen 54. The location is forwarded as the first initiation signal to microprocessor 134. Microprocessor 134 may then process the first initiation signal.

At (306), method (300) includes receiving, in response to the first initiation signal, a first activation signal at the main controller. After microprocessor 134 processes the first initiation signal, microprocessor 134 determines that the location of the first user input on touchscreen 54 corresponds with a location associated with starting or initiating the self-clean cycle. Accordingly, a first activation signal is sent to main controller 120. Main controller 120 receives the first activation signal. Accordingly, the first step of initiating the self-cleaning cycle is completed.

At (308), method (300) in some implementations, method (300) includes activating, in response to receiving the first activation signal at the main controller, a second user control of the user interface panel. For instance, upon or after receiving the first activation signal at main controller 120 at (306), main controller 120 sends a trigger signal to microcontroller 154. Microcontroller 154 receives the trigger signal, and based on the trigger signal, microcontroller 154 activates second user control 150. By activating second user control 150, second user control becomes operational. That is, when second user control 150 is pressed, touched, or a user input is otherwise provided, second user control 150 can be used to initiate a safety-critical operation. Before activation, in this example, second user control 150 cannot be used to initiate a safety-critical operation.

In some implementations, upon receiving the first activation signal, a timer associated with main controller 120 commences a countdown. The countdown is set such that a user has a predetermined time in which to provide a user input to second user control 150 to confirm initiation of the safety-critical operation. That is, main controller 120 does not activate the one or more operational components 110 at (318) to operate oven appliance 10 in the safety-critical operation if the second activation signal is not received by main controller 120 within the predetermined time after receiving the first activation signal. By switching second user control 150 between operational states (i.e., active and non-active), inadvertent initiation of safety-critical operations may be prevented and further safety is provided by requiring confirmation of initiation of the safety-critical operation, e.g., within a predetermined time. In alternative implementations, second user control 150 may always be active.

At (310), method (300) includes illuminating, in response to receiving the first activation signal at the main controller, the second user control of the user interface panel. For instance, as noted previously, upon or after receiving the first activation signal at main controller 120 at (306), main controller 120 sends a trigger signal to microcontroller 154. Microcontroller 154 receives the trigger signal, and based on the trigger signal, microcontroller 154 activates second backlight 156 to illuminate second user control 150, which in this example implementation is discrete key 56. Thus, discrete key 56 becomes visible to the user, e.g., as shown in FIG. 5. The activation of second backlight 156 to illuminate discrete key 56 directs a user's attention to the key thus making it intuitive for the user that discrete key 56 is required to initiate the safety-critical operation. In some implementations, second user control 150 is illuminated at (310) and activated at (308) simultaneously.

At (312), method (300) includes receiving a second user input at second user control. For instance, the second user control may be discrete key 56 and the second user input may be a touch or press of discrete key 56. In FIG. 5, a user is shown providing a second user input to discrete key 56, which is second user control 150 in this example. Particularly, the user is shown in FIG. 5 pressing the "Start/Cancel" discrete key 56.

At (314), method (300) includes receiving a second initiation signal at a microcontroller in response to a user manipulation of the second user control. For instance, microcontroller 154 may receive the second initiation signal from the electronics of discrete key 56. The second initiation signal may be in the form of a pulsed voltage or current, for example. Microcontroller 154 processes the second initiation signal.

At (316), method (300) includes receiving, in response to the second initiation signal, a second activation signal at the main controller. After microcontroller 154 processes the second initiation signal, microcontroller 154 determines that the user has in fact provided a second user input to second user control 150. Accordingly, microcontroller 154 sends a second activation signal to main controller 120. Main controller 120 receives the second activation signal. Accordingly, the second step of initiating the self-cleaning cycle is completed.

At (318), method (300) includes activating, upon receiving the first activation signal and the second activation signal, one or more operational components to operate the oven appliance in the self-cleaning cycle. For instance, the one or more operational components may be one or more of heating elements 40, 42. Upon receiving the first activation signal and the second activation signal, the main controller 120 determines that both initiation steps have been completed, and accordingly, main controller 120 activates one or both of heating elements 40, 42, e.g., to perform the self-cleaning cycle. In addition, in some implementations, upon receiving the first activation signal and the second activation signal, the main controller 120 communicates a lock command to a locking mechanism of the oven appliance 10, e.g., to lock door 16 (FIG. 2). In this way, once the heating elements 40, 42 are activated, consumers are prevented from opening door 16 during the safety-critical operation.

In some implementations of method (300), prior to main controller activating the one or more operational components 110 to operate the oven appliance 10 in the self-cleaning cycle, microcontroller 154 performs a self-test operation of the hardware and critical functions of microcontroller 154 and various other components of control system 100. If no critical issues are found by microcontroller 154 during the self-test operation, microcontroller 154 sends a self-test confirmation signal to main controller 120. Upon receiving the self-test confirmation from microcontroller 154, main controller 120 activates the one or more operational components 110 to operate the oven appliance 10 in the self-cleaning cycle.

Figure 8:
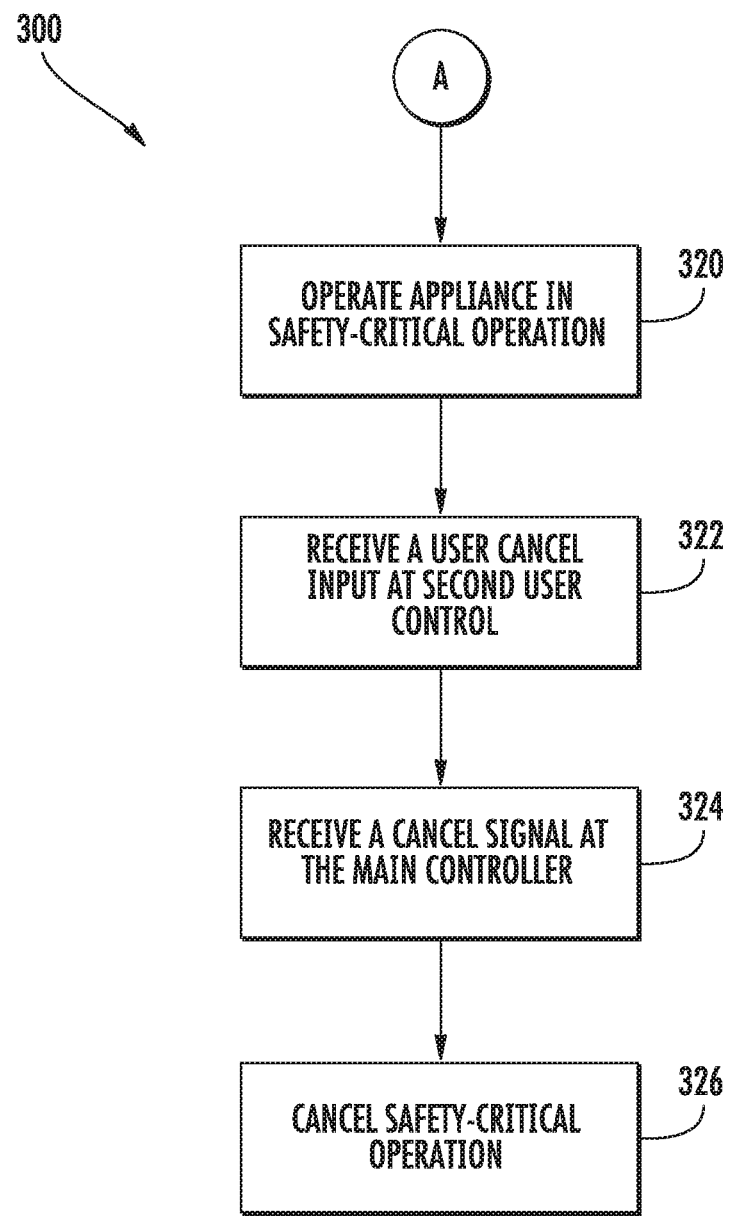
FIG. 8 provides a flow diagram of an exemplary method for canceling an appliance performing a safety-critical operation.

FIG. 8 provides a flow diagram of an exemplary implementation of method (300) for canceling an appliance performing a safety-critical operation.

At (320), after activating the one or more operational components to operate the oven appliance in the self-cleaning cycle, method (300) includes operating the oven appliance in the self-cleaning cycle for a predetermined run time. For instance, the predetermined run time may be three (3) hours, four (4) hours, five (5) hours, etc. In this manner, deposits and debris within the cooking chamber 14 (FIG. 2) may be burned off during the self-cleaning cycle.

At (322), method (300) includes receiving a user cancel signal at the second user control. Should a user desire to interrupt the safety-critical operation, the user provides the user cancel input to discrete key 56. The discrete key 56 (second user control 150) remains illuminated until either the predetermined run time has elapsed or the self-cleaning cycle is canceled upon the user cancel input of discrete key 56; thus, the "Cancel" button remains illuminated at all times during operation of the safety-critical operation, e.g., as shown in FIG. 6. When the user provides the user cancel input to discrete key 56 during operation of the appliance in the safety-critical operation, microcontroller 154 receives one or more signals from the electronics of discrete key 56 that are indicative of discrete key 56 being pressed, touched, or otherwise manipulated. Microcontroller 154 processes the signals.

At (324), after the microcontroller receives and processes the signals from the user cancel input at second user control, method (300) includes receiving, in response to the user cancel input at the second user control, a cancel signal at the main controller. That is, after microcontroller 154 receives and processes the signals from discrete key 56 of the user cancel input, microcontroller 154 sends and main controller 120 receives a cancel signal.

In some implementations, after or upon receiving, in response to the user cancel input at the second user control, the cancel signal at the main controller at (324), the method (300) further includes de-illuminating the second user control. For instance, upon or after receiving the cancel signal at main controller 120 at (324), main controller 120 sends a de-illumination signal to microcontroller 154. Microcontroller 154 receives the de-illumination signal, and based on the de-illumination signal, microcontroller 154 deactivates second backlight 156 to de-illuminate second user control 150, which in this example implementation is discrete key 56. Thus, discrete key 56 is no longer visible to the user.

At (326), method (300) includes canceling, upon receiving the cancel signal at the main controller, the self-cleaning cycle. For instance, upon receiving the cancel signal at main controller 120, main controller 120 deactivates or terminates operation of the one or more operational components 110 performing the safety-critical operation. Accordingly, the user may interrupt the safety-critical operation as a one-step process. In some implementations, the touchscreen 54 may present an indicia indicating that the safety-critical operation has been canceled thus signaling to the user that he or she has successfully canceled the safety-critical operation.

In some implementations, during operating the appliance in the safety-critical operation for the predetermined run time at (320), the method (300) further includes, performing, by the microcontroller, a self-test operation at predetermined intervals. Further, if one or more system issues are detected by the microcontroller during one of the self-test operations, the method (300) includes canceling, automatically, the safety-critical operation.

This written description uses examples to disclose the invention, including the best mode, and to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An appliance, comprising:
a control system for operating the appliance in a safety-critical operation, the control system comprising:
  a main controller;
  a user interface panel comprising a first user control and a second user control, wherein the first user control is a touchscreen and the second user control is a discrete key that is separate from, and not a part of, the touchscreen, the discrete key being a dynamic key;
  a microprocessor housed on a first control board, the microprocessor being communicatively coupled with the main controller and the first user control and having a first class compliance, the microprocessor configured to:
    receive a first initiation signal from the first user control to initiate the safety-critical operation;
  a microcontroller housed on a second control board, the second control board being communicatively coupled with the main controller and the second user control and having a second class compliance different from the first class compliance, the microcontroller configured to:
    activate, from an inoperative state, the second user control;
    receive a second initiation signal from the second user control to initiate the safety-critical operation;
  wherein the main controller is configured to:
    receive, in response to the first initiation signal received at the microprocessor, a first activation signal from the microprocessor;
    receive, in response to the second initiation signal received at the microcontroller, a second activation signal from the microcontroller, wherein the second activation signal is received via the second user control, the second user control being operational only after the first activation signal is received by the main controller; and
    cause, upon receiving the first activation signal and the second activation signal, the appliance to operate in the safety-critical operation.

2. The appliance of claim 1, wherein the second class compliance of the microcontroller is a UL 60730 Class B compliance.

3. The appliance of claim 1, wherein upon or after receiving the first activation signal from the microprocessor, the main controller is further configured to:
send a trigger signal to the microcontroller;
wherein after receiving the trigger signal, the microcontroller is configured to:
  activate the second user control; and
  activate a second backlight to illuminate the second user control.

4. The appliance of claim 3, wherein during operation of the appliance in the safety-critical operation, the second user control remains illuminated.

5. The appliance of claim 3, wherein during operation of the appliance in the safety-critical operation, the microcontroller is further configured to:

receive one or more signals indicative of a user cancel input to the second user control;

upon receiving the one or more signals indicative of the user cancel input to the second user control, send a cancel signal to the main controller.

6. The appliance of claim 3, wherein after the microcontroller activates the second user control and activates the second backlight to illuminate the second user control, the main controller is further configured to cause, upon receiving the first activation signal and the second activation signal, the appliance to operate in the safety-critical operation only if the second activation signal is received by the main controller within a predetermined time after receiving the first activation signal.

7. The appliance of claim 1, wherein the appliance is an oven appliance and the safety-critical operation is a self-cleaning cycle.

8. The appliance of claim 7, wherein the oven appliance comprises a cabinet defining an oven cavity.

9. The appliance of claim 1, wherein the first user control is illuminated by a first backlight and the second user control is illuminated by a second backlight.

10. The appliance of claim 1, wherein during operating the appliance in the safety-critical operation, the microcontroller is configured to perform a self-test operation at predetermined intervals, and wherein the main controller is configured to automatically cancel the safety-critical operation if one or more system issues are detected by the microcontroller during one of the self-test operations.

11. The appliance of claim 1, wherein after the main controller receives the first activation signal and the second activation signal but prior to causing the appliance to operate in the safety-critical operation, the microcontroller is configured to perform a self-test operation to detect one or more system issues.

12. An oven appliance, comprising:
a control system for operating the oven appliance in a self-cleaning operation, the control system comprising:
a main controller;
a user interface panel comprising a touchscreen and a discrete key, the discrete key that is separate from, and not a part of, the touchscreen, the discrete key being a dynamic key;
a microprocessor housed in a first control board, the microprocessor being communicatively coupled with the main controller and the touchscreen and having a first class compliance, the microprocessor configured to:
receive, in response to a touch input to a predefined touch region of the touchscreen, a first initiation signal from the touchscreen to initiate the self-cleaning operation;
a microcontroller housed in a second control board, the second control board being communicatively coupled with the main controller and the discrete key and having a second class compliance different from the first class compliance, the microcontroller configured to:
receive, in response to a touch input to the discrete key, a second initiation signal from the discrete key to initiate the safety-critical operation, wherein the discrete key becomes active, operational, and illuminated only after the main controller receives the first activation signal;
wherein the main controller is configured to:
receive, in response to the first initiation signal received at the microprocessor, a first activation signal from the microprocessor;
receive, in response to the second initiation signal received at the microcontroller, a second activation signal from the microcontroller wherein the second activation signal is received via the second user control, the second user control being operational only after the first activation signal is received by the main controller; and
cause, upon receiving the first activation signal and the second activation signal, the oven appliance to perform the self-cleaning operation.

13. The oven appliance of claim 12, wherein the discrete key is an electronic pushbutton that is not part of the touchscreen.

* * * * *